United States Patent
Bayat et al.

(10) Patent No.: US 12,017,242 B2
(45) Date of Patent: Jun. 25, 2024

(54) ATOMISER ASSEMBLY WITH OSCILLATION CHAMBER

(71) Applicant: Philip Morris Products S.A., Neuchatel (CH)

(72) Inventors: Dara Bayat, Neuchatel (CH); Michel Bessant, Neuchatel (CH); Jerome Christian Courbat, Neuchatel (CH); Olivier Dubochet, Neuchatel (CH); Ivar Kjelberg, Neuchatel (CH); Philippe Niedermann, Peseux (CH); Pascal Andre Daniel Jean Pratte, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 894 days.

(21) Appl. No.: 17/055,319

(22) PCT Filed: May 7, 2019

(86) PCT No.: PCT/EP2019/061741
§ 371 (c)(1),
(2) Date: Nov. 13, 2020

(87) PCT Pub. No.: WO2019/219457
PCT Pub. Date: Nov. 21, 2019

(65) Prior Publication Data
US 2021/0219605 A1     Jul. 22, 2021

(30) Foreign Application Priority Data

May 16, 2018 (EP) .................................... 18172753

(51) Int. Cl.
*B05B 17/00*     (2006.01)
*A24F 40/05*     (2020.01)
(Continued)

(52) U.S. Cl.
CPC .......... *B05B 17/0638* (2013.01); *A24F 40/05* (2020.01); *A24F 40/42* (2020.01);
(Continued)

(58) Field of Classification Search
CPC . B05B 17/0638; B05B 17/0646; A24F 40/53; A24F 40/57; A24F 40/05;
(Continued)

(56) References Cited

U.S. PATENT DOCUMENTS

| | | | |
|---|---|---|---|
| 6,196,219 B1 | 3/2001 | Hess et al. | |
| 7,896,262 B2 * | 3/2011 | Suzuki | F02M 61/1813 239/584 |

(Continued)

FOREIGN PATENT DOCUMENTS

| | | |
|---|---|---|
| CN | 103180053 A | 6/2013 |
| CN | 105873462 A | 8/2016 |

(Continued)

OTHER PUBLICATIONS

Combined Russian Office Action and Search Report dated Aug. 9, 2022 in Russian Patent Application No. 2020141033/05 (with unedited computer generated English Translation), 22 pages.

(Continued)

*Primary Examiner* — Thanh Tam T Le
(74) *Attorney, Agent, or Firm* — Oblon, McClelland, Maier & Neustadt, L.L.P.

(57) ABSTRACT

An atomiser assembly is provided, including: an oscillation chamber having a cavity containing a liquid to be atomized, a liquid inlet configured to provide a supply of the liquid to be atomized to the cavity, an elastically deformable element, and a mesh element comprising a plurality of nozzles; and an actuator configured to oscillate the elastically deformable element, the oscillation chamber and the liquid being contained in the cavity of the oscillation chamber form an (Continued)

oscillation system, in which oscillation of the elastically deformable element by the actuator varies pressure inside the cavity, and the actuator being further configured to oscillate the elastically deformable element at a resonant frequency of the oscillation system to eject liquid contained in the cavity from the cavity through the plurality of nozzles of the mesh element. An aerosol-generating system, an aerosol-generating device, and a method of operating an atomiser assembly are also provided.

17 Claims, 3 Drawing Sheets

(51) Int. Cl.
  *A24F 40/42* (2020.01)
  *A24F 40/53* (2020.01)
  *A24F 40/57* (2020.01)
  *G06K 7/10* (2006.01)
  *G06K 19/07* (2006.01)
  *A24F 40/10* (2020.01)
  *H02J 7/00* (2006.01)
(52) U.S. Cl.
  CPC .............. *A24F 40/53* (2020.01); *A24F 40/57* (2020.01); *B05B 17/0646* (2013.01); *G06K 7/10366* (2013.01); *G06K 19/0723* (2013.01); *A24F 40/10* (2020.01); *H02J 7/0045* (2013.01)
(58) Field of Classification Search
  CPC ..... A24F 40/42; A24F 40/10; G06K 7/10366; G06K 19/0723; H02J 7/0045
  See application file for complete search history.

(56) References Cited

U.S. PATENT DOCUMENTS

| | | | | |
|---|---|---|---|---|
| 9,888,719 | B2* | 2/2018 | Cadieux | A24F 40/50 |
| 9,993,023 | B2* | 6/2018 | Tucker | A24F 40/46 |
| 10,143,234 | B2* | 12/2018 | Hon | H05B 3/22 |
| 10,179,215 | B2* | 1/2019 | Raichman | A61K 36/185 |
| 10,349,674 | B2* | 7/2019 | Sur | B05B 17/0646 |
| 10,653,179 | B2* | 5/2020 | Matsumoto | A24F 40/485 |
| 2011/0315786 | A1* | 12/2011 | Kambayashi | B05B 17/0646 239/102.2 |
| 2012/0091229 | A1* | 4/2012 | Laidler | B05B 11/026 222/207 |
| 2013/0068797 | A1* | 3/2013 | Laidler | B05B 11/1028 222/321.6 |
| 2013/0299607 | A1* | 11/2013 | Wilkerson | A61M 15/025 239/328 |
| 2017/0119059 | A1* | 5/2017 | Zuber | A24F 40/46 |
| 2021/0120878 | A1* | 4/2021 | Bayat | B05B 17/0676 |
| 2021/0197222 | A1* | 7/2021 | Bayat | B05B 17/0638 |

FOREIGN PATENT DOCUMENTS

| | | |
|---|---|---|
| CN | 106510005 A | 3/2017 |
| EA | 009116 B1 | 10/2007 |
| EP | 1 129 741 A2 | 9/2001 |
| JP | 58-66706 A | 4/1983 |
| JP | 2004-243115 A | 9/2004 |
| JP | 2008-168222 A | 7/2008 |
| JP | 2015-522444 A | 8/2015 |
| JP | 2019-500897 A | 1/2019 |
| JP | 2019-502364 A | 1/2019 |
| KR | 10-2013-0081655 A | 7/2013 |
| RU | 2 517 100 C2 | 5/2014 |
| WO | WO 2009/150619 A1 | 12/2009 |
| WO | WO 2016/198879 A1 | 12/2016 |
| WO | WO 2016/199062 A1 | 12/2016 |
| WO | WO 2017/076590 A1 | 5/2017 |
| WO | WO 2017/084848 A1 | 5/2017 |
| WO | WO 2017/149093 A1 | 9/2017 |

OTHER PUBLICATIONS

International Search Report and Written Opinion dated Jul. 29, 2019 in PCT/EP2019/061741 filed on May 7, 2019.
Japanese Office Action dated Apr. 27, 2023 in Japanese Patent Application No. 2020-562177 (with English Translation), 9 pages.
Combined Chinese Office Action and Search Report dated Aug. 26, 2023 in Chinese Application 201980028219.3, 5 pages.
Japanese Office Action dated Sep. 28, 2023 in Japanese Application 2020/562177, (with English translation), 4 pages.

* cited by examiner

ATOMISER ASSEMBLY WITH OSCILLATION CHAMBER

CROSS-REFERENCE TO RELATED APPLICATIONS

This application is a U.S. national stage application of PCT/EP2019/061741, filed on May 7, 2019, which is based upon and claims the benefit of priority under 35 U.S.C. § 119 from European patent application no. 18172753.8, filed May 16, 2018, the entire contents of each of which are incorporated herein by reference.

TECHNICAL FIELD

The present invention relates to an atomiser assembly. The present invention also relates to an aerosol-generating system comprising the atomiser assembly, an aerosol-generating device for an aerosol-generating system comprising the atomiser assembly and a method of generating an aerosol with the atomiser assembly.

DESCRIPTION OF THE RELATED ART

Handheld electrically operated aerosol-generating systems that consist of a power supply section comprising a battery and control electronics, and a cartridge comprising a supply of liquid aerosol-forming substrate held in a storage portion and an electrically operated atomiser assembly are known. In some examples, the atomiser assembly may comprise an electrical heating element for generating an aerosol by heating and vaporising the liquid aerosol-forming substrate.

Some devices comprise an atomiser assembly comprising a mesh element defining one or more nozzles, wherein the device is arranged to supply the liquid aerosol-forming substrate to one side of the mesh element. The mesh element may be vibrated against the supply of liquid aerosol-forming substrate to generate an aerosol by forcing droplets of liquid aerosol-forming substrate through the nozzles. This arrangement may be referred to as an active mesh element.

Alternative arrangements may comprise an actuator arranged to vibrate the supply of liquid aerosol-forming substrate against the mesh element to force droplets of liquid aerosol-forming substrate through the nozzles. This arrangement may be referred to as a passive mesh element.

An atomiser assembly comprising a mesh element will exhibit a minimum droplet size that may be generated by the atomiser assembly for a particular liquid aerosol-forming substrate. Typically, a small droplet size is desired to maximise pulmonary delivery of the aerosolised liquid aerosol-forming substrate. A droplet size of no more than 2.5 micrometres in diameter may be desired to maximise pulmonary delivery. For droplet sizes of 2.5 micrometres in diameter or less, it is considered that at least 80 percent of droplets will reach the pulmonary alveoli when inhaled.

One means for reducing the droplet size produced by a mesh element is to reduce the cross-sectional size of the nozzles. However, smaller cross-sectional nozzle sizes require a larger pressure to force liquid aerosol-forming substrate through the nozzles. Therefore, in known systems comprising a mesh element, further reduction of the cross-sectional size of the nozzles is typically prevented when the required increase in liquid pressure is prohibitively large. Another means for reducing the droplet size produced by a mesh element is to reduce the length of the nozzles. However, smaller nozzle lengths require a thinner mesh element, which reduces the rigidity of the mesh element and reduces the maximum pressure that the mesh element is able to withstand. Other means are required for reducing the droplet size produced by a mesh.

It would be desirable to provide an atomiser assembly that facilitates generation of an aerosol exhibiting a small droplet size. For example, it would be desirable to provide an atomiser assembly that facilitates generation of an aerosol exhibiting a droplet size of no more than 2.5 micrometres in diameter. It would be desirable to provide an atomiser assembly that reduces or minimises the power required to operate the assembly.

SUMMARY

According to a first aspect of the invention, there is provided an atomiser assembly. The atomiser assembly comprises an oscillation chamber having: a cavity containing a liquid to be atomised; a liquid inlet for providing a supply of the liquid to be atomized to the cavity; an elastically deformable element; and a mesh element comprising a plurality of nozzles. The atomiser assembly also comprises an actuator arranged to oscillate the elastically deformable element. The oscillation chamber and the liquid contained in the cavity of the oscillation chamber form an oscillation system and oscillation of the elastically deformable element by the actuator varies the pressure inside the cavity. The actuator is configured to oscillate the elastically deformable element at a resonant frequency of the oscillation system to eject liquid contained in the cavity from the cavity through the nozzles of the mesh element.

BRIEF DESCRIPTION OF THE DRAWINGS

The invention will be further described, by way of example only, with reference to the accompanying drawings, in which.

DETAILED DESCRIPTION

Figure 1:
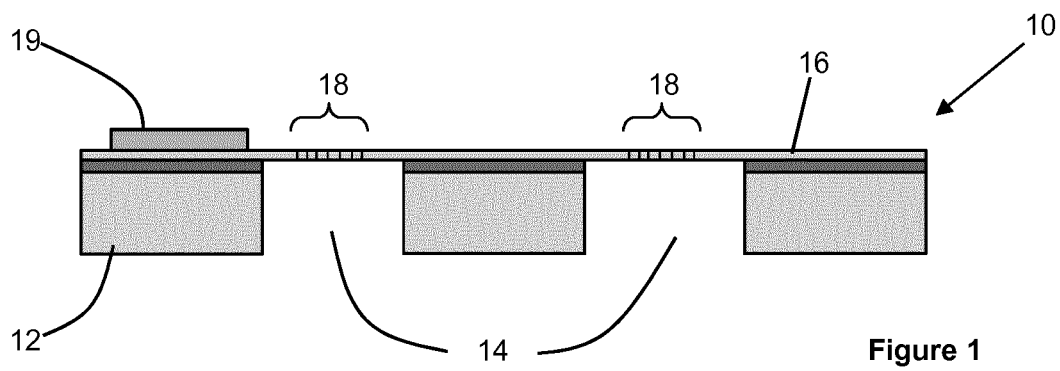
FIG. 1 shows a cross-sectional view of a mesh element of an atomiser assembly according to an embodiment of the present invention.

During use of the atomiser assembly, the liquid to be atomised is supplied to the cavity through the liquid inlet. The actuator oscillates the elastically deformable element to force at least some of the liquid within the cavity through the plurality of nozzles of the mesh element. The liquid forced through the plurality of nozzles of the mesh element forms a plurality of droplets. The momentum of the liquid forced through the plurality of nozzles to form the plurality of droplets carries the droplets away from the mesh element.

Therefore, during use, the atomiser assembly generates an aerosol comprising liquid droplets ejected through the mesh element.

As used herein, the term "resonance" refers to forced vibration at a natural frequency of a system. Similarly, the term "resonant frequency" refers to a driving oscillation at a natural frequency of a system. In other words, the actuator of the atomiser assembly is configured to oscillate the elastically deformable element at a natural frequency of the oscillation system.

The present inventors have recognised that the atomiser assembly of the present invention comprises an oscillation system having a natural frequency, which may be driven at resonance. Advantageously, driving the oscillation system at resonance causes the amplitude of the oscillations of the oscillation system to increase compared to oscillations at other frequencies. This increase in amplitude of the oscillations of the oscillation system enables the amplitude of the driving oscillations supplied to the actuator, such as the amplitude of the voltage or current supplied to the actuator, to be decreased, while maintaining the necessary amplitude of the oscillations of the oscillation system to eject liquid from the nozzles of the mesh element at the required speed. Advantageously, reducing the amplitude of the driving oscillations supplied to the actuator may enable a reduction in the power required to oscillate the elastically deformable element. Advantageously, driving the oscillation system at resonance may also enable a reduction in the size of the actuator and the elastically deformable element, as one or more of the actuator and elastically deformable element may be required to be larger at other frequencies in order to achieve the necessary oscillation amplitude to eject liquid from the nozzles of the mesh element at the required speed.

The oscillation system may have a plurality of natural frequencies, which may be referred to as resonant modes or harmonics. The lowest natural frequency of the oscillation system is typically referred to as the fundamental frequency or first harmonic of the oscillation system. The actuator may be configured to oscillate the elastically deformable element at any suitable resonant frequency or harmonic. The actuator may be configured to oscillate the elastically deformable element at a resonant frequency of the oscillation system that is equal to the first harmonic. The actuator may be configured to oscillate the elastically deformable element at a resonant frequency of the oscillation system that is equal to or greater than a second harmonic of the oscillation system. The actuator may be configured to oscillate the elastically deformable element at the highest harmonic of the oscillation system.

Advantageously, driving oscillation of the oscillation system at the second harmonic may enable the atomiser assembly to eject droplets at a higher rate than when the system is driven at the first harmonic. Driving oscillation of the oscillation system at higher harmonics may further increase the rate of ejection of droplets from the atomiser assembly. Increasing the droplet ejection rate from the atomiser assembly may enable the volume of aerosol generated by the atomiser assembly to be increased. Increasing the droplet ejection rate from the atomiser assembly may also enable the number of nozzles provided in the mesh element to be decreased without decreasing the volume of aerosol generated by the atomiser assembly.

The actuator may be configured to oscillate the elastically deformable element at any suitable frequency to achieve resonance of the oscillation system. For example, the actuator may be configured to oscillate the elastically deformable element at a frequency of between about 0.05 MHz and about 10.0 MHz, between about 0.1 MHz and about 5.0 MHz, between about 0.2 MHz and about 4.5 MHz, between about 0.3 MHz and about 3 MHz, between about 0.4 MHz and about 2.5 MHz or between about 0.5 MHz and about 2 MHz.

One or more of the resonant frequencies or harmonics of the oscillation system may be determined in a calibration stage. The calibration stage may be performed before the first use of the atomiser assembly by a user, such a before the atomiser assembly has left the factory. In a calibration stage, the frequency of the oscillation of the elastically deformable element may be varied and the amplitude of the oscillations of the oscillation system at each frequency may be recorded. The resonant frequencies or harmonics of the oscillation system may be determined by identifying peaks in the amplitude of the oscillations of the oscillation system at specific frequencies.

One or more of the determined resonant frequencies may be stored as resonant frequency calibration data. In some embodiments, the atomiser assembly may comprise a memory storing the resonant frequency calibration data. In some embodiments, control circuitry may be associated with the atomiser assembly and the control circuitry may comprise a memory storing the resonant frequency calibration data. The control circuitry may be control circuitry of an aerosol-generating device that comprises or is configured for use with the atomiser assembly.

The oscillation chamber may take any suitable form. The oscillation chamber may generally be formed from a housing of the atomiser assembly, the mesh element, the elastically deformable element.

The atomiser assembly may comprise a housing. The housing may be formed from any suitable materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The atomiser assembly may comprise one or more walls at least partially defining the cavity between the mesh element and the elastically deformable element. The atomiser assembly housing may comprise at least one side wall. The cavity may be bound by the mesh element, the elastically deformable element and the at least one side wall. The liquid inlet may extend through the at least one side wall.

Preferably, the elastically deformable element is arranged opposite the mesh element. Preferably, the actuator is arranged to oscillate the elastically deformable element towards and away from the mesh element.

The cavity of the atomiser assembly may be any suitable shape and size. The cavity of the atomiser assembly may be substantially cylindrical.

The capacity of the cavity of the oscillation chamber may be between about 0.30 microlitres and about 50 microlitres, between about 0.35 microlitres and about 25 microlitres, between about 0.40 microlitres and about 12 microlitres or between about 0.45 microlitres and about 9 microlitres.

In some embodiments, the cavity of the atomiser assembly comprises a central region, directly between the mesh element and the elastically deformable element, and a radially outer region, between the elastically deformable element and the housing of the atomiser assembly, radially outwards of the central region. The cavity may further comprise a restricted region between the central region and the radially outer region. The restricted region may comprise a narrow region between the central region and the radially outer region that restricts the flow of liquid between the central region and the radially outer region. The provision of a restricted region may enable the pressure generated in the central region to be greater than the pressure in the cavity without the restricted region. The restricted region may also help to prevent liquid in the cavity from being forced out of the cavity through the liquid inlet, when the elastically deformable element is oscillated. The central region may be substantially cylindrical. The radially outer region may be substantially annular or tubular. The radially outer region may extend into the at least one side wall of the atomiser assembly. The radially outer region may provide a store of liquid that may be immediately available to resupply the central region when liquid is ejected from the central region through the nozzles of the mesh element.

The liquid inlet may extend through the at least one side wall of the atomiser assembly housing to the radially outer region. The liquid inlet may be arranged in the at least one side wall such that the liquid inlet is offset from the central region of the cavity.

In some embodiments, the atomiser assembly may have a proximal end, a distal end opposite the proximal end and a longitudinal axis extending between the proximal end and the distal end. The mesh element may be arranged at the proximal end. The cavity may comprise a central region between the mesh element and the elastically deformable element. The cavity may further comprise a radially outer region that extends at least partially along the side wall of the atomiser assembly, in the direction of the longitudinal axis towards the distal end of the atomiser assembly. The liquid inlet may extend through the side wall of the atomiser assembly to the radially outer region of the cavity. The liquid inlet may be spaced from the central region of the cavity along the longitudinal axis. In other words, the liquid inlet may be offset from the central region of the cavity. This arrangement of the liquid inlet may reduce the likelihood of liquid being pushed out of the cavity through the liquid inlet when subjected to oscillations from the elastically deformable element. This arrangement of the liquid inlet may also reduce the possibility of air entering the central region of the cavity from the liquid inlet.

The elastically deformable element may comprise any suitable elastically deformable material. For example, the elastically deformable element may comprise plastic, rubber or silicon. In some preferred embodiments, the elastically deformable element comprises silicon. In some embodiments, the elastically deformable element may comprise a metal or a metal alloy, such as nickel, palladium or an alloy of nickel and palladium. The elastically deformable element may comprise platinum or titanium. In some embodiments, the elastically deformable element may comprise stainless steel. In some embodiments, the elastically deformable element is formed from the same material as the atomiser housing. In some embodiments, the elastically deformable element is formed from a different material to the atomiser housing. In some embodiments, the elastically deformable element is formed from the same material as the mesh element.

In preferred embodiments, the elastically deformable element is formed from a material that is chemically inert to the aerosol-forming substrate.

The elastically deformable element may be substantially planar. In some embodiments, the elastically deformable element has a substantially constant thickness. In some embodiments, the elastically deformable element has a thickness that varies across the elastically deformable element. A portion of the elastically deformable element may be in contact with the actuator. The portion of the elastically deformable element in contact with the actuator may have a thickness that is greater than the thickness of the other portions of the elastically deformable element. In embodiments wherein the cavity of the oscillation chamber comprises a central region between the mesh element and the elastically deformable element, the elastically deformable element may have a central region overlying the mesh element and a radially outer region radially outwards of the central region. The thickness of the central region of the elastically deformable element may be greater than the thickness of the radially outer region of the elastically deformable element. In these embodiments, the actuator may overlie the central region of the elastically deformable element and the central region of the cavity. The actuator may contact the elastically deformable element at the central region.

The actuator may comprise any suitable type of actuator. In some embodiments, the actuator may comprise a piezoelectric element. In some embodiments, the actuator may comprise an ultrasonic sonotrode.

The atomiser assembly may comprise a pre-loading element arranged to compress the actuator between the pre-loading element and the elastically deformable element. The pre-loading element may be adjustable to vary the compression of the actuator between the pre-loading element and the elastically deformable element. In embodiments comprising a piezoelectric element as the actuator, compressing the piezoelectric element using the pre-loading element may increase the force generated by the actuator. It has been found that compressing or "pre-loading" a piezoelectric element by half of the compression capacity of the piezoelectric element can result in the piezoelectric element generating ten times the force that is generated by the uncompressed piezoelectric element. The pre-loading element may be adjustable. The pre-loading element may comprise a screw. The pre-loading element may be manually adjustable. The pre-loading element may be automatically adjustable. The atomiser assembly may comprise a motor arranged to move the pre-loading element to vary the compression of the actuator between the pre-loading element and the elastically deformable element.

The pre-loading element may be movably securable to the housing of the atomiser assembly. Varying the position of the pre-loading element relative to the atomiser housing assembly may vary the compression of the actuator between the pre-loading element and the elastically deformable element. For example, the pre-loading element may comprise a male screw thread and the atomiser assembly may comprise a female screw thread, and rotating the pre-loading element relative to the atomiser housing may vary the compression of the actuator between the pre-loading element and the elastically deformable element.

In particular, in embodiments wherein the actuator is a piezoelectric element, the piezoelectric element may be arranged between the pre-loading element and the elastically deformable element. The piezoelectric element may be compressed between the pre-loading element and the elastically deformable element. The pre-loading element may be adjustable to vary the compression of the piezoelectric element between the pre-loading element and the elastically deformable element.

The mesh element comprises a plurality of nozzles. As used herein, the term "nozzle" refers to an aperture, hole or bore through the mesh element that provides a passage for liquid to move through the mesh element.

The mesh element may comprise an inner surface and an outer surface, wherein the plurality of nozzles extend between the inner surface and the outer surface. The inner surface of the mesh element may face the cavity of the oscillation chamber. The outer surface of the mesh element may face away from the cavity of the oscillation chamber.

The mesh element may have any suitable size and shape. The mesh element may be substantially planar. The mesh element may be substantially circular.

The plurality of nozzles of the mesh element may be arranged in any suitable manner across the mesh element. In some embodiments, the plurality of nozzles may be arranged in a repeating pattern on the mesh element. In some embodiments, the plurality of nozzles may be arranged randomly on the mesh element.

The mesh element may comprise a thickness between the inner surface and the outer surface. The thickness of the mesh element may be at least about 1 micrometre, at least about 2 micrometres, at least about 3 micrometres, at least about 4 micrometres, at least about 5 micrometres, at least about 6 micrometres, at least about 7 micrometres, at least about 8 micrometres or at least about 9 micrometres. The thickness of the mesh element may be less than about 50 micrometres, less than about 45 micrometres, less than about 40 micrometres, less than about 35 micrometres, less than about 30 micrometres, less than about 25 micrometres, less than about 20 micrometres, less than about 15 micrometres, or less than about 12 micrometres. The mesh element may have a thickness of about 10 micrometres.

Each nozzle may comprise a length, wherein the length of each nozzle is the shortest distance along the nozzle between the inner surface and the outer surface. The length of each nozzle may be the same as the thickness of the mesh element. The length of each nozzle may be at least about 1 micrometre, at least about 2 micrometres, at least about 3 micrometres, at least about 4 micrometres, at least about 5 micrometres, at least about 6 micrometres, at least about 7 micrometres, at least about 8 micrometres or at least about 9 micrometres. The length of each nozzle may be less than about 50 micrometres, less than about 45 micrometres, less than about 40 micrometres, less than about 35 micrometres, less than about 30 micrometres, less than about 25 micrometres, less than about 20 micrometres, less than about 15 micrometres, or less than about 12 micrometres. Each nozzle may have a length of about 10 micrometres.

Each nozzle may comprise a maximum cross-sectional area. The maximum cross-sectional of each nozzle may be orthogonal to the length of the nozzles. The maximum cross-sectional area of each nozzle may be at least about 0.01 square micrometres, at least about 0.05 square micrometres, at least about 0.1 square micrometres, at least about 0.2 square micrometres, at least about 0.3 square micrometres, at least about 0.4 square micrometres, at least about 0.5 square micrometres, at least about 0.6 square micrometres, at least about 0.7 square micrometres, or at least about 0.8 square micrometres. The maximum cross-sectional area of each nozzle may be less than about 20 square micrometres, less than about 19 square micrometres, less than about 18 square micrometres, less than about 17 square micrometres, less than about 16 square micrometres, less than about 15 square micrometres, less than about 14 square micrometres, less than about 13 square micrometres, less than about 12 square micrometres, less than about 11 square micrometres, or less than about 10 square micrometres. Each nozzle may have a minimum cross-sectional area, wherein the minimum cross-sectional area of the nozzle is equal to or less than the maximum cross-sectional area of the nozzle. The minimum cross-sectional area of each nozzle may be at least about 0.01 square micrometres, at least about 0.05 square micrometres, at least about 0.1 square micrometres, at least about 0.2 square micrometres, at least about 0.3 square micrometres, at least about 0.4 square micrometres, at least about 0.5 square micrometres, at least about 0.6 square micrometres, at least about 0.7 square micrometres, or at least about 0.8 square micrometres. The minimum cross-sectional area of each nozzle may be less than about 20 square micrometres, less than about 19 square micrometres, less than about 18 square micrometres, less than about 17 square micrometres, less than about 16 square micrometres, less than about 15 square micrometres, less than about 14 square micrometres, less than about 13 square micrometres, less than about 12 square micrometres, less than about 11 square micrometres, or less than about 10 square micrometres.

Each nozzle may have any suitable cross-sectional shape.

Each nozzle may have a first cross-sectional shape along a second line parallel with the length of the nozzle. The first cross-sectional shape of each nozzle may be circular, elliptical, oval, triangular, square, rectangular, or any other polygonal shape. Preferably, the first cross-sectional shape of each nozzle is triangular. The term "triangular" is used herein to refer to shapes comprising a triangle or triangular elements. For example, the first cross-sectional shape may comprise a triangle, a truncated triangle, a truncated triangle with a square or rectangular portion extending from the truncated part of the triangle, and so forth. Advantageously, a triangular first cross-sectional shape may provide the nozzles with a convergent flow area. Advantageously, a convergent flow area may reduce or minimise the pressure required to force liquid through the nozzle while also providing a desired minimum cross-sectional area of the nozzle.

Each nozzle may have a second cross-sectional shape orthogonal to the second length of the nozzle. In other words, the second cross-sectional shape defines the maximum cross-sectional area of the nozzle. The second cross-sectional shape of each nozzle may be circular, elliptical, oval, triangular, square, rectangular, or any other polygonal shape. Preferably, the second cross-sectional shape of each nozzle is circular.

Each nozzle may have a maximum width or diameter. The maximum diameter of each nozzle may be at least about 0.1 micrometres, at least about 0.25 micrometres, at least about 0.5 micrometres, at least about 0.75 micrometres, or at least about 1 micrometre. The maximum diameter of each nozzle may be less than about 10 micrometres, less than about 9 micrometres, less than about 8 micrometres, less than about 7 micrometres, less than about 6 micrometres, less than about 5 micrometres, or less than about 4 micrometres.

Each nozzle may have a minimum width or diameter, wherein the minimum diameter of each nozzle is equal to or less than the maximum diameter of the nozzle. The minimum diameter of each nozzle may be at least about 0.1 micrometres, at least about 0.25 micrometres, at least about 0.5 micrometres, at least about 0.75 micrometres, at least about 1 micrometre. The minimum diameter of each nozzle may be less than about 10 micrometres, less than about 9 micrometres, less than about 8 micrometres, less than about 7 micrometres, less than about 6 micrometres, less than about 5 micrometres, or less than about 4 micrometres.

In embodiments in which the mesh element comprises an outer surface and an inner surface, the mesh element may comprise a hydrophobic coating on the outer surface. The term "hydrophobic" is used herein to refer to a material that exhibits a water contact angle of larger than 90 degrees. Advantageously, in embodiments in which an aqueous liquid is dispensed through the mesh element, the hydrophobic coating advantageously increases or maximises the contact angle between the aqueous liquid and the outer surface. Advantageously, an increased or maximised contact angle improves the release of liquid droplets from the outer surface. Advantageously, improving the release of liquid droplet from the outer surface may facilitate reducing or minimising the size of the liquid droplets.

The hydrophobic coating may be provided on one or more regions of the outer surface.

For example, the hydrophobic coating may comprise at least one annular region of hydrophobic material surrounding each nozzle.

The hydrophobic coating may be provided on the entire outer surface of the mesh element. The hydrophobic coating may comprise at least one of polyurethane (PU), a fluorocarbon (PFC), polytetrafluoroethylene (PTFE) and a superhydrophobic metal. Suitable super-hydrophobic metals include microporous metals and metal meshes functionalised with carbon chains. Exemplary metals include copper and aluminium.

The hydrophobic coating may be formed by a surface modification. For example, the outer surface may be chemically modified to provide a desired degree of hydrophobicity.

The hydrophobic coating may be formed by deposition of a hydrophobic material on the outer surface. For example, the hydrophobic material may be deposited on the outer surface using at least one of a physical vapour deposition process and a chemical vapour deposition process.

In some embodiments, the mesh element comprises a hydrophilic coating on the inner surface. The mesh element may comprise a hydrophilic coating on the at least one nozzle surface.

The term "hydrophilic" is used herein to refer to a material that exhibits a water contact angle of less than 90 degrees. Advantageously, in embodiments in which an aqueous liquid is dispensed through the mesh element, the hydrophilic coating may facilitate the flow of the aqueous liquid towards the first layer and through the at least one channel and the at least one nozzle.

Hydrophilic coatings may comprise at least one of 3 polyamide, polyvinyl acetate (PVAc), cellulose acetate, cotton, and one or more hydrophilic oxides. Suitable hydrophilic oxides include silicon dioxide, aluminium oxide, titanium dioxide, and tantalum pentoxide.

Hydrophilic coatings may be formed by a surface modification. For example, a surface may be chemically modified to provide a desired degree of hydrophilicity. In embodiments in which the hydrophilic coating comprises at least one hydrophilic oxide, the hydrophilic coating may be formed by oxidation of a material forming the mesh element.

Hydrophilic coatings may be formed by deposition of a hydrophilic material on a surface of the mesh element. For example, the hydrophilic material may be deposited using at least one of a physical vapour deposition process and a chemical vapour deposition process.

The outer surface of the mesh element may define an annular portion extending around each nozzle, wherein a thickness of the mesh element at each annular portion is larger than a thickness of the mesh element between adjacent annular portions. Advantageously, the annular portion may facilitate separation of a liquid droplet from liquid remaining inside each nozzle. In embodiments in which the mesh element comprises a hydrophobic coating, preferably at least part of the hydrophobic coating is provided on the annular portion. In embodiments in which the hydrophobic coating comprises one or more annular regions of hydrophobic material, preferably each annular region of hydrophobic material is positioned on an annular portion.

The annular portion may have a rounded shape. Advantageously, a rounded shape may further facilitate separation of a liquid droplet from liquid remaining inside the nozzle. The annular portion may have a semi-circular cross-sectional shape.

In some embodiments, the mesh element may comprise a first layer and a second layer. The second layer may overlie the first layer. The first layer may define at least one channel. The second layer may define the plurality of nozzles. Each nozzle may overlie at least one channel. The at least one channel may comprise a minimum cross-sectional area. Each nozzle may comprise a maximum cross-sectional area. The maximum cross-sectional area of each nozzle may be smaller than the minimum cross-sectional area of the at least one channel. The first layer may comprise a first surface and a second surface, wherein the at least one channel extends between the first surface and the second surface. The second layer may comprise an inner surface and an outer surface, wherein the at least one nozzle extends between the inner surface and the outer surface. Preferably, the inner surface of the second layer faces the second surface of the first layer. Preferably, the outer surface of the second layer faces away from the first layer.

The at least one channel may have a first length. The first length is the shortest distance along the at least one channel between the first surface and the second surface. The first length of the at least one channel is larger than the second length of the nozzles.

Preferably, the first layer comprises a first thickness extending between the first surface and the second surface. Preferably, the second layer comprises a second thickness extending between the inner surface and the outer surface. Preferably, the first thickness is larger than the second thickness.

Preferably, the first layer has a first thickness of at least about 0.1 millimetres, preferably at least about 0.15 millimetres, preferably at least about 0.2 millimetres, preferably at least about 0.25 millimetres, preferably at least about 0.3 millimetres. Preferably, the first layer has a first thickness of less than about 1 millimetre, preferably less than about 0.95 millimetres, preferably less than about 0.9 millimetres, preferably less than about 0.85 millimetres, preferably less than about 0.8 millimetres, preferably less than about 0.75 millimetres, preferably less than about 0.7 millimetres, preferably less than about 0.65 millimetres, preferably less than about 0.6 millimetres. Preferably, the second layer has a second thickness of at least about 1 micrometre, preferably at least about 2 micrometres, preferably at least about 3 micrometres, preferably at least about 4 micrometres, preferably at least about 5 micrometres, preferably at least about 6 micrometres, preferably at least about 7 micrometres, preferably at least about 8 micrometres, preferably at least about 9 micrometres. Preferably, the second layer has a second thickness of less than about 50 micrometres, preferably less than about 45 micrometres, preferably less than about 40 micrometres, preferably less than about 35 micrometres, preferably less than about 30 micrometres, preferably less than about 25 micrometres, preferably less than about 20 micrometres, preferably less than about 15 micrometres, preferably less than about 12 micrometres. The second layer may have a second thickness of about 10 micrometres. Preferably, the at least one channel has a first length, wherein the first length is the shortest distance along the at least one channel between the first surface and the second surface. In embodiments in which the first layer comprises a first thickness, the first length of the at least one channel may be the same as the first thickness of the first layer. Preferably, the first length is at least about 0.1 millimetres, preferably at least about 0.15 millimetres, preferably at least about 0.2 millimetres, preferably at least about 0.25 millimetres, preferably at least about 0.3 millimetres. Preferably, the first length is less than about 1 millimetre, preferably less than about 0.95 millimetres, preferably less than about 0.9 millimetres, preferably less than about 0.85 millimetres, preferably less than about 0.8 millimetres, preferably less than about 0.75 millimetres, preferably less than about 0.7 millimetres, preferably less than about 0.65 millimetres, preferably less than about 0.6 millimetres. Preferably, the minimum cross-sectional of the at least one channel is orthogonal to the first length of the at least one channel.

Preferably, the at least one nozzle has a second length, wherein the second length is the shortest distance along the at least one nozzle between the inner surface and the outer surface. In embodiments in which the second layer comprises a second thickness, the second length of the at least one nozzle may be the same as the second thickness of the second layer. Preferably, the second length is at least about 1 micrometre, preferably at least about 2 micrometres, preferably at least about 3 micrometres, preferably at least about 4 micrometres, preferably at least about 5 micrometres, preferably at least about 6 micrometres, preferably at least about 7 micrometres, preferably at least about 8 micrometres, preferably at least about 9 micrometres. Preferably, the second length is less than about 50 micrometres, preferably less than about 45 micrometres, preferably less than about 40 micrometres, preferably less than about 35 micrometres, preferably less than about 30 micrometres, preferably less than about 25 micrometres, preferably less than about 20 micrometres, preferably less than about 15 micrometres, preferably less than about 12 micrometres. The second layer may have a second thickness of about 10 micrometres. Preferably, the maximum cross-sectional of the at least one nozzle is orthogonal to the second length of the at least one nozzle.

Preferably, the first length of the at least one channel is larger than the second length of the at least one nozzle.

The plurality of nozzles may overlie the at least one channel.

The at least one channel may be a single channel, wherein the plurality of nozzles overlies the single channel.

The at least one channel may comprise a plurality of channels, wherein each channel underlies at least two of the nozzles. The plurality of channels may comprise a first channel underlying a first plurality of the nozzles and a second channel underlying a second plurality of the nozzles.

Advantageously, providing a plurality of nozzles overlying each channel may simplify the manufacture of the mesh element by reducing the number of channels required in the first layer.

Preferably, each channel underlies at least about 5 nozzles, preferably at least about 10 nozzles, preferably at least about 15 nozzles, preferably at least about 20 nozzles. Preferably, each channel underlies less than about 150 nozzles, preferably less than about 140 nozzles, preferably less than about 130 nozzles, preferably less than about 120 nozzles, preferably less than about 110 nozzles, preferably less than about 100 nozzles.

Preferably, the minimum cross-sectional area of the at least one channel is at least about 0.01 square millimetres, preferably at least about 0.02 square millimetres, preferably at least about 0.03 square millimetres, preferably at least about 0.04 square millimetres, preferably at least about 0.05 square millimetres. Preferably, the minimum cross-sectional area of the at least one channel is less than about 0.5 square millimetres, preferably less than about 0.45 square millimetres, preferably less than about 0.4 square millimetres, preferably less than about 0.35 square millimetres, preferably less than about 0.3 square millimetres.

The at least one channel may have any suitable cross-sectional shape.

The at least one channel may have a first cross-sectional shape along a first line parallel with the first length of the at least one channel. The first cross-sectional shape of the at least one channel may be circular, elliptical, oval, triangular, square, rectangular, or any other polygonal shape. Preferably, the first cross-sectional shape of the at least one channel is square or rectangular.

The at least one channel may have a second cross-sectional shape orthogonal to the first length of the at least one channel. In other words, the second cross-sectional shape defines the minimum cross-sectional area of the at least one channel. The second cross-sectional shape of the at least one channel may be circular, elliptical, oval, triangular, square, rectangular, or any other polygonal shape. Preferably, the second cross-sectional shape of the at least one channel is circular. The at least one channel may have a minimum diameter. The minimum diameter of the at least one channel may be at least about 0.1 millimetres, at least about 0.15 millimetres, at least about 0.2 millimetres, or at least about 0.25 millimetres. The minimum diameter of the at least one channel may be less than about 1 millimetre, less than about 0.95 millimetres, less than about 0.9 millimetres, less than about 0.85 millimetres, less than about 0.8 millimetres, less than about 0.75 millimetres, less than about 0.7 millimetres, less than about 0.65 millimetres, or less than about 0.6 millimetres.

The first layer and the second layer may be integrally formed. In other words, the first layer and the second layer may be formed as a single element.

The second layer may be formed separately from the first layer. Preferably, the second layer is secured to the first layer. For example, the second layer may be secured to the first layer by at least one of an interference fit, an adhesive, and a weld.

The mesh element may comprise any suitable material. For example, the mesh element may comprise silicon-on-insulator wafer. In embodiments comprising a mesh element having a first layer and a second layer, the first layer may comprise a first silicon wafer and the second layer may comprise a second silicon wafer. The mesh element may comprise a buried oxide layer between the first silicon wafer and the second silicon wafer. The buried oxide layer may be formed by oxidation of a surface of at least one of the first silicon wafer and the second silicon wafer before the first and second silicon wafers are bonded to each other.

The plurality of nozzles may be formed in the mesh element using any suitable process. The plurality of nozzles may be formed using at least one of laser perforation and electro discharge machining.

In embodiments comprising a mesh element having a first layer and a second layer, the at least one channel may be formed in the first layer using any suitable process. The at least one channel may be formed using at least one of laser perforation and electro discharge machining. The liquid to be atomised may be a liquid aerosol-forming substrate. The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise at least one aerosol-former. An aerosol-former is any suitable known compound or mixture of compounds that, in use, facilitates formation of a dense and stable aerosol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavourants.

The liquid aerosol-forming substrate may comprise water.

The liquid aerosol-forming substrate may comprise nicotine and at least one aerosol former. The aerosol former may comprise glycerine. The aerosol-former may comprise propylene glycol. The aerosol former may comprise both glycerine and propylene glycol. The liquid aerosol-forming substrate may have a nicotine concentration of between about 2% and about 10%.

The present inventors have recognised that the natural frequencies of the oscillation system depend on the characteristics and properties of the liquid to be atomised. In particular, the natural frequencies depend on the viscosity of the liquid to be atomised.

In some embodiments, the liquid to be atomised may have a particular viscosity. For example, the liquid to be atomised may have a viscosity at 20 degrees Celsius that is equal to or less than about 40 centipoise (mPas), preferably equal to or less than about 35 centipoise (mPas), preferably equal to or less than about 30 centipoise (mPas), preferably equal to or less than about 25 centipoise (mPas), preferably equal to or less than about 20 centipoise (mPas), preferably equal to or less than about 15 centipoise (mPas).

The viscosity values used herein refer to viscosity measured using a classical Brookfield viscometer, which measures viscosity of a fluid by measuring the resistance to rotation of a spindle in the fluid at a defined speed or shear rate. Unless stated otherwise, viscosity values recited herein are the viscosity of an 8 millilitre (mL) sample volume of liquid aerosol-forming substrate measured using a Brookfield RVDV-II+Pro viscometer fitted with a Brookfield Small Sample Adapter comprising a cylindrical SC4-13R Sample Chamber and a cylindrical SC4-21 Spindle at a speed of 100 revolutions per minute (rpm).

The atomiser assembly may be configured to control the temperature of the liquid to be atomised to control the viscosity of the liquid. Advantageously, reducing the viscosity of the liquid to be atomised reduces the pressure required to force the liquid through the nozzles of the mesh element. Increasing the temperature of a liquid to be atomised may reduce the viscosity of the liquid. The atomiser assembly may be provided with a heater for heating the liquid to be atomised. The heater may be configured to heat the liquid to be atomised in the cavity to a predetermined temperature. The predetermined temperature may be between about 20 degrees Celsius and about 100 degrees Celsius, between about 70 degrees Celsius and about 90 degrees Celsius and may be preferably about 80 degrees Celsius.

The liquid aerosol-forming substrate may have a viscosity at 80 degrees Celsius that is equal to or less than about 20 centipoise (mPas), preferably equal to or less than about 15 centipoise (mPas), preferably equal to or less than about 10 centipoise (mPas), preferably equal to or less than about 7 centipoise (mPas), preferably equal to or less than about 5 centipoise (m Pas).

The atomiser assembly may comprise a heater for heating the liquid in the cavity. The heater may be configured to heat the liquid in the cavity to a predetermined temperature to control the viscosity of the liquid. The heater may be any suitable type of heater. Preferably, the heater is an electric heater.

Advantageously, heating a liquid may reduce the viscosity of the liquid. Advantageously, reducing the viscosity of the liquid may reduce or minimise the size of liquid droplets formed by forcing the liquid through the nozzles.

The mesh element may comprise an electrical heating element positioned on a surface of the mesh element. Advantageously, the electrical heating element may be used to heat a liquid to be ejected through the nozzles of the mesh element.

The electrical heating element may be arranged to directly heat a liquid to be ejected through the plurality of nozzles. The electrical heating element may be positioned on the outer surface of the mesh element. In embodiments comprising a mesh element having a first layer and a second layer, the electrical heating element may be positioned on the outer surface of the second layer. In other embodiments, the electrical heating element may be positioned on the first surface of the first layer.

The electrical heating element may be arranged to indirectly heat a liquid to be ejected through the nozzles. The electrical heating element may be positioned on the outer surface of the second layer.

The electrical heating element may comprise any suitable type of heating element. For example, the electrical heating element may comprise a microelectromechanical systems heating element.

The electrical heating element may comprise an adhesion layer. The adhesion layer may facilitate bonding of the electrical heating element to the mesh element. The adhesion layer may comprise any suitable material. The adhesion layer may comprise a metal. The adhesion layer may comprise tantalum.

The electrical heating element may comprise one or more resistive heating tracks. The one or more resistive heating tracks may comprise a metal. The one or more resistive heating tracks may comprise at least one of platinum, nickel, and polysilicon.

The electrical heating element may comprise a passivation layer. The passivation layer may comprise at least one of a metal oxide and a metal nitride. The passivation layer may comprise at least one of silicon nitride, silicon dioxide, titanium dioxide, and aluminium oxide. According to a second aspect of the present invention, there is provided an aerosol-generating system comprising an atomiser assembly according to the first aspect of the present invention. The aerosol-generating system further comprises a liquid reservoir containing a supply of the liquid to be atomised.

In some embodiments, the liquid reservoir and the atomiser are comprised in the same unit. In these devices, a liquid outlet of the liquid reservoir is in fluid communication with the liquid inlet of the oscillation chamber to supply liquid from the liquid reservoir into the cavity of the oscillation chamber.

In some embodiments, the aerosol-generating system comprises a cartridge comprising the liquid reservoir and an aerosol-generating device configured to removably receive the cartridge. The aerosol-generating device may comprise a device connector for receiving the cartridge.

In some particular embodiments, the cartridge may further comprise the atomiser assembly. In these particular embodiments, a liquid outlet of the liquid reservoir may be in fluid communication with the liquid inlet of the atomiser assembly. The actuator of the atomiser assembly may be electrically connectable to the aerosol-generating device when the cartridge is received by the aerosol-generating device. Where the atomiser assembly comprises an electric heater, the electric heater may also be electrically connectable to the aerosol-generating device when the cartridge is received by the aerosol-generating device. In these particular embodiments, the cartridge may comprise a device connector comprising one or more electrical connectors for electrically connecting the cartridge to the aerosol-generating device. The aerosol-generating device may comprise a corresponding device connector comprising one or more electrical connectors for electrically connecting the device to the cartridge.

In some particular embodiments, the aerosol-generating device may comprise the atomiser assembly. In these particular embodiments, the liquid reservoir of the cartridge may have a liquid outlet that is arrangeable in fluid communication with the liquid inlet of the atomiser assembly of the aerosol-generating device when the cartridge is received by the aerosol-generating device. In these particular embodiments, the cartridge may comprise a device connector comprising one or more liquid outlets for fluidly connecting the cartridge to the aerosol-generating device. The aerosol-generating device may comprise a corresponding device connector comprising one or more liquid inlets for fluidly connecting the device to the cartridge.

The device connectors of the aerosol-generating device and the cartridge may comprise at least one of a bayonet connector, a screw connector, a magnetic connector, and an interference fit connector.

The liquid reservoir may comprise a container, wherein the liquid to be atomised is held within the container. The container may be formed from any suitable material. The container may be formed from at least one of glass, metal, and plastic. The container may be transparent. The container may be translucent.

The container may define an opening through which the liquid aerosol-forming substrate may flow from the container. Preferably, the liquid reservoir comprises a seal overlying the opening to seal the liquid aerosol-forming substrate within the container. Preferably, the seal is at least one of removable and frangible. The aerosol-generating device may comprise a piercing element arranged to pierce the seal when the liquid reservoir is at least partially received by the device connector.

The aerosol-generating device comprises a power supply and a controller arranged to control a supply of power from the power supply to the actuator of the atomiser assembly.

During use, the controller controls a supply of power from the power supply to the actuator to eject droplets of liquid through the mesh element, as described herein.

In embodiments in which the atomiser assembly comprises an electrical heating element, preferably the controller is arranged to control a supply of power from the power supply to the electrical heating element. The aerosol-generating device may be arranged to heat the electrical heating element during use to any suitable temperature, such as a temperature of between about 20 degrees Celsius and about 100 degrees Celsius or a temperature of between about 70 degrees Celsius and about 90 degrees Celsius. Preferably, the aerosol-generating device is arranged to heat the electrical heating element during use to a temperature of about 80 degrees Celsius.

The power supply may be a DC voltage source. In preferred embodiments, the power supply is a battery. For example, the power supply may be a nickel-metal hydride battery, a nickel cadmium battery, or a lithium based battery, for example a lithium-cobalt, a lithium-iron-phosphate or a lithium-polymer battery. The power supply may comprise another form of charge storage device such as a capacitor. The power supply may require recharging and may have a capacity that allows for the storage of enough energy for use of the aerosol-generating device with one or more liquid reservoirs.

The aerosol-generating device may comprise a housing. The controller and the power supply may be arranged within the housing. The device connector for receiving a liquid reservoir may be arranged within the housing. In embodiments wherein the device comprises the atomiser assembly, the atomiser assembly may be arranged within the housing.

The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

In some embodiments, the device housing may define an aerosol chamber arranged to receive liquid droplets ejected from the mesh element during use of the aerosol-generating device. The aerosol-generating device may comprise an air inlet in fluid communication with the aerosol chamber. The aerosol-generating device may comprise an air outlet in fluid communication with the aerosol chamber.

The cartridge may comprise a housing. The cartridge housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

In some embodiments, the cartridge housing may define an aerosol chamber arranged to receive liquid droplets ejected from the mesh element during use of the aerosol-generating device. In these embodiments, the cartridge comprises an air inlet in fluid communication with the aerosol chamber. The cartridge may comprise an air outlet in fluid communication with the aerosol chamber.

The aerosol-generating device may comprise a mouthpiece in fluid communication with the air outlet. The mouthpiece may be formed integrally with the housing. The mouthpiece may be detachable from the housing.

During use, a user draws on the mouthpiece to draw air into the aerosol chamber through the air inlet. The air flows through the aerosol chamber where liquid droplets ejected from the mesh element are entrained within the airflow to form an aerosol. The aerosol flows out of the aerosol chamber through the air outlet and is delivered to the user through the mouthpiece.

The aerosol-generating device may comprise a sensor to detect airflow indicative of a user taking a puff. The air flow sensor may be an electro-mechanical device. The air flow sensor may be any of a mechanical device, an optical device, an opto-mechanical device and a micro electro-mechanical systems (MEMS) based sensor. The controller may be arranged to supply power from the power supply to the actuator of the atomiser assembly in response to a signal from the air flow sensor indicative of a user taking a puff.

In some embodiments, the aerosol-generating device further comprises a liquid identification system, for identifying the liquid to be atomised contained in the liquid reservoir of the cartridge. The liquid identification system may comprise any suitable type of identification system.

The cartridge may further comprise an identifier for identifying the liquid contained in the liquid reservoir. The liquid identification system of the aerosol-generating device may comprise a detector for detecting the identifier of the cartridge when the cartridge is received on the aerosol-generating device. For example, the cartridge may comprise an RFID tag and the device may comprise an RFID sensor. For example, the cartridge may comprise a barcode and the device may comprise an optical sensor.

In some embodiments, the liquid identification system may comprise a sensor for sensing a property or characteristic of the liquid to be atomised. The sensor may be provided with a sample of the liquid to be atomised from the liquid reservoir of the cartridge.

The controller of the aerosol-generating device may be configured to control the supply of power from the power supply to the atomiser assembly based on information received by the controller from the identification system.

In embodiments wherein the cartridge comprises an identifier, reference data corresponding to known identifiers may be stored on a memory of the controller. In these embodiments, the controller may be configured to compare information received from the identification system to the stored reference data to determine if the identifier detected by the identification system is a known identifier.

If the information received from the identification system corresponds to a known identifier, this indicates that the cartridge is an authentic or approved cartridge of the manufacturer that contains a suitable liquid to be atomised. If the information received from the identification system corresponds to a known identifier, the controller may be configured to supply power from the power supply to the atomiser assembly.

If the identifier is not a known identifier, the controller may determine that the cartridge is not an authorised or approved cartridge, which may not containing a suitable or approved liquid to be atomised. If the information received from the information detection system does not correspond to a known identifier, the controller may be configured to prevent power from being supplied from the power supply to the atomiser assembly.

In some embodiments, the controller may store reference data corresponding to a plurality of known identifiers. Each known identifier may also be associated with a particular liquid to be atomised, which may require a specific power to be supplied from the power supply to the atomiser assembly. The controller may be configured to supply a specific power to the atomiser assembly based on the particular identifier that is determined to have been detected by the identification system.

In embodiments wherein a characteristic or property of the liquid stored in the liquid reservoir of the cartridge is sensed or detected by the identification system, the controller may be configured to compare the information received from the identification system to one or more predetermined thresholds, to determine at least one of whether the liquid stored in the liquid reservoir is suitable for use with the atomiser assembly and the power to supply to the atomiser assembly.

The aerosol-generating device may comprise a manually operable switch for a user to initiate a puff. The controller may be arranged to supply power from the power supply to the actuator of the atomiser assembly in response to a signal from the manually operable switch.

Preferably, the aerosol-generating device comprises an indicator for indicating when power is being suppled from the power supply to the actuator of the atomiser assembly. The indicator may comprise a light arranged to illuminate when power is being suppled from the power supply to the actuator of the atomiser assembly.

The aerosol-generating device may comprise at least one of an external plug or socket and at least one external electrical contact allowing the aerosol-generating device to be connected to another electrical device. For example, the aerosol-generating device may comprise a USB plug or a USB socket to allow connection of the aerosol-generating device to another USB enabled device. The USB plug or socket may allow connection of the aerosol-generating device to a USB charging device to charge a rechargeable power supply within the aerosol-generating device. The USB plug or socket may support the transfer of data to or from, or both to and from, the aerosol-generating device. The aerosol-generating device may be connectable to a computer to transfer data to the aerosol-generating device.

In those embodiments in which the aerosol-generating device comprises a USB plug or socket, the aerosol-generating device may further comprise a removable cover that covers the USB plug or socket when not in use. In embodiments in which the USB plug or socket is a USB plug, the USB plug may additionally or alternatively be selectively retractable within the device.

According to a third aspect of the present invention, there is provided an aerosol-generating device comprising an atomiser assembly according to the first aspect of the present invention. The aerosol-generating device also comprises a power supply and a controller arranged to control a supply of power from the power supply to the actuator of the atomiser assembly. The aerosol-generating device also comprises a device connector for receiving a liquid reservoir and arranged to supply liquid from a liquid reservoir to the liquid inlet of the atomiser assembly.

According to a fourth aspect of the present invention, there is provided a method of operating an atomiser assembly. The atomiser assembly comprises: an oscillation chamber having: a cavity containing a liquid to be atomised; a liquid inlet for providing a supply of the liquid to be atomized to the cavity; an elastically deformable element; and a mesh element comprising a plurality of nozzles; and an actuator arranged to oscillate the elastically deformable element. The method comprises driving the actuator to oscillate the elastically deformable element at a resonant frequency of the oscillation system to eject liquid contained in the cavity from the cavity through the nozzles of the mesh element.

In some embodiments, the method comprises driving the actuator to oscillate the elastically deformable element at a resonant frequency of the oscillation system that is equal to or greater than a second harmonic of the oscillation system It will be appreciated that any feature described in relation to one aspect of the invention may be equally applicable to another aspect of the invention. Any aspect described in relation to the first aspect may be equally applicable to the second, third and fourth aspects, and vice versa. Any aspect described in relation to the second aspect may be equally applicable to the third and fourth aspects, and vice versa. Any aspect described in relation to the third aspect may be equally applicable to the fourth aspect, and vice versa.

Figure 2:
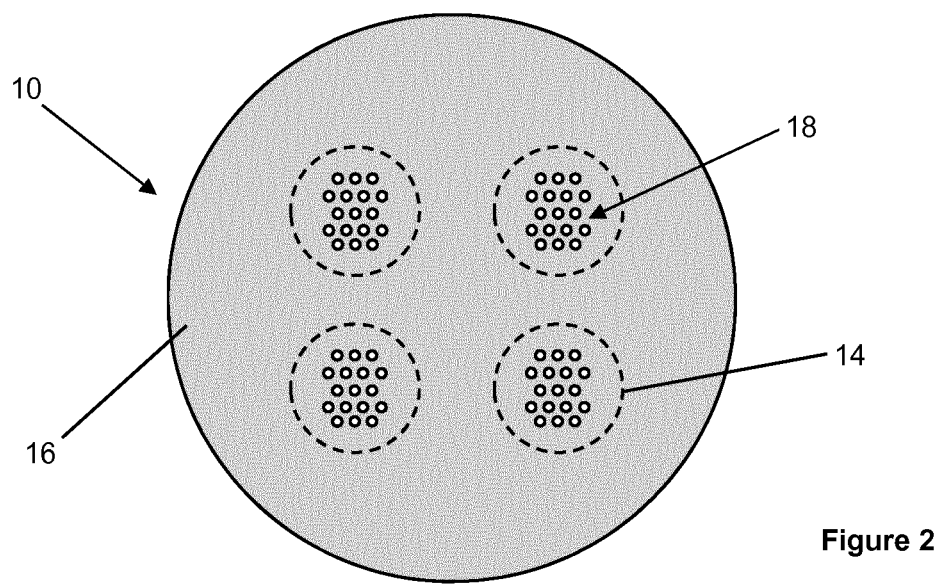
FIG. 2 shows a plan view of the mesh element of FIG. 1.

FIGS. 1 and 2 show a mesh element 10 for an atomiser assembly according to an embodiment of the present invention. The mesh element 10 comprises a first layer 12 defining a plurality of cylindrical channels 14 and a second layer 16 defining a plurality of nozzles 18. The nozzles 18 are arranged into groups, wherein each group of nozzles 18 overlies one of the channels 14.

The mesh element 10 also comprises an electrical heating element 19 positioned on the second layer 16. During use, the electrical heating element 19 heats the mesh element 10, which heats liquid being ejected through the nozzles 18.

Figure 3:
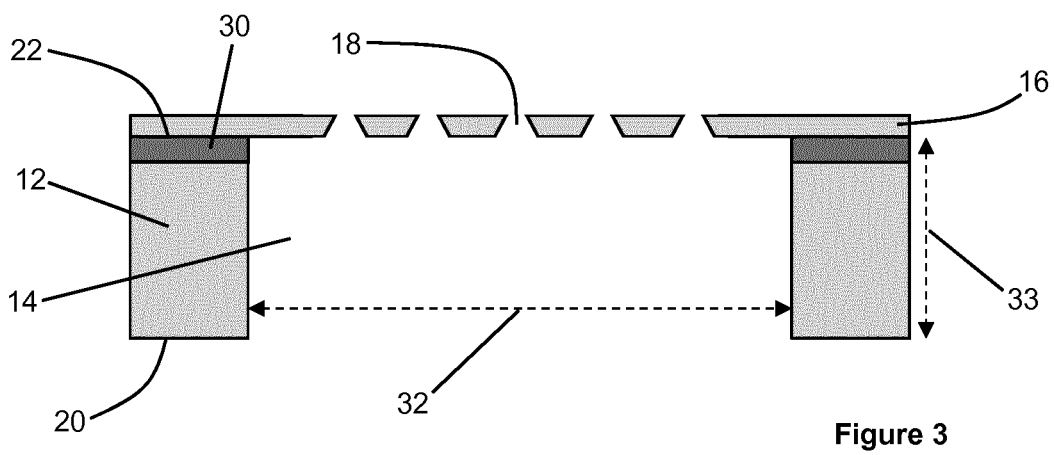
FIG. 3 shows an enlarged cross-sectional view of a portion of the mesh element of FIG. 1.
Figure 4:
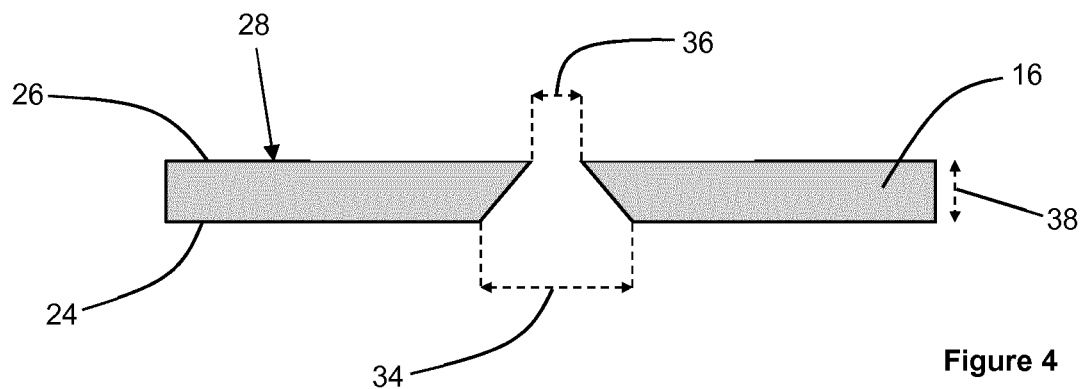
FIG. 4 shows a cross-sectional view of a single nozzle of the mesh element of FIG. 1.

FIGS. 3 and 4 show enlarged cross-sectional views of one of the channels 14 and one of the nozzles 18. The first layer 12 comprises a first surface 20 and a second surface 22. The second layer 16 comprises an inner surface 24 facing the second surface 22 of the first layer 12. The second layer 16 also comprises an outer surface 26 on which a hydrophobic coating 28 is provided. The first and second layers 12, 16 are formed from silicon wafers. A buried oxide layer 30 is formed by oxidation of the second surface 22 of the first layer 12 before the first and second layers 12, 16 are bonded together during the manufacture of the mesh element 10.

Each channel 14 has a minimum diameter 32 and a length corresponding to a thickness 33 of the first layer 12. The minimum diameter 32 of each channel 14 is significantly larger than a maximum diameter 34 of each overlying nozzle 18. Therefore, each channel 14 has a minimum cross-sectional area that is larger than the maximum cross-sectional area of each nozzle 18. As such, the length of the channel 14 does not contribute to a length of each nozzle 18 when determining the pressure required to force a given liquid through each nozzle 18. Advantageously, the thickness 33 of the first layer 12 can be selected to provide the mesh element with a desired strength and rigidity without affecting the pressure required to eject liquid droplets from the nozzles 18.

Each nozzle 18 has a triangular cross-sectional shape such that each nozzle 18 has a maximum diameter 34 at the inner surface 24 of the second layer 16 and a minimum diameter 36 at the outer surface 26 of the second layer 16. The minimum diameter 36 of each nozzle 18 is selected according to the desired size of liquid droplets to be ejected through the nozzle 18 during use. Each nozzle 18 has a length corresponding to a thickness 38 of the second layer 16. The thickness 38 of the second layer 16 is significantly smaller than the thickness 33 of the first layer 12 to minimise the length of each nozzle 18. The triangular cross-sectional shape of each nozzle 18 and the minimised length of each nozzle 18 reduce or minimise the pressure required to force a given liquid through each nozzle 18.

Figure 5:
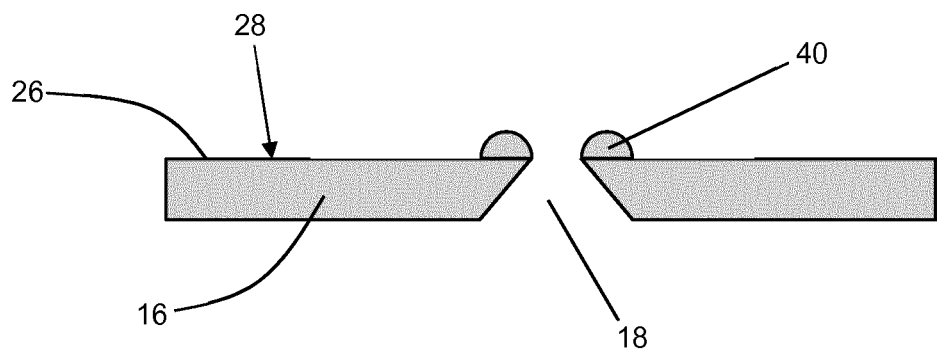
FIG. 5 shows a cross-sectional view of a single nozzle of the mesh element of FIG. 1 illustrating an alternative outer surface of the second layer.

As shown in FIG. 5, the outer surface 26 of the second layer 16 may comprise an annular portion 40 of increased thickness surrounding each nozzle 18. The semi-circular cross-sectional shape of each annular portion 40 facilitates separation of liquid droplets from liquid remaining inside each nozzle 18 during use.

Figure 6:
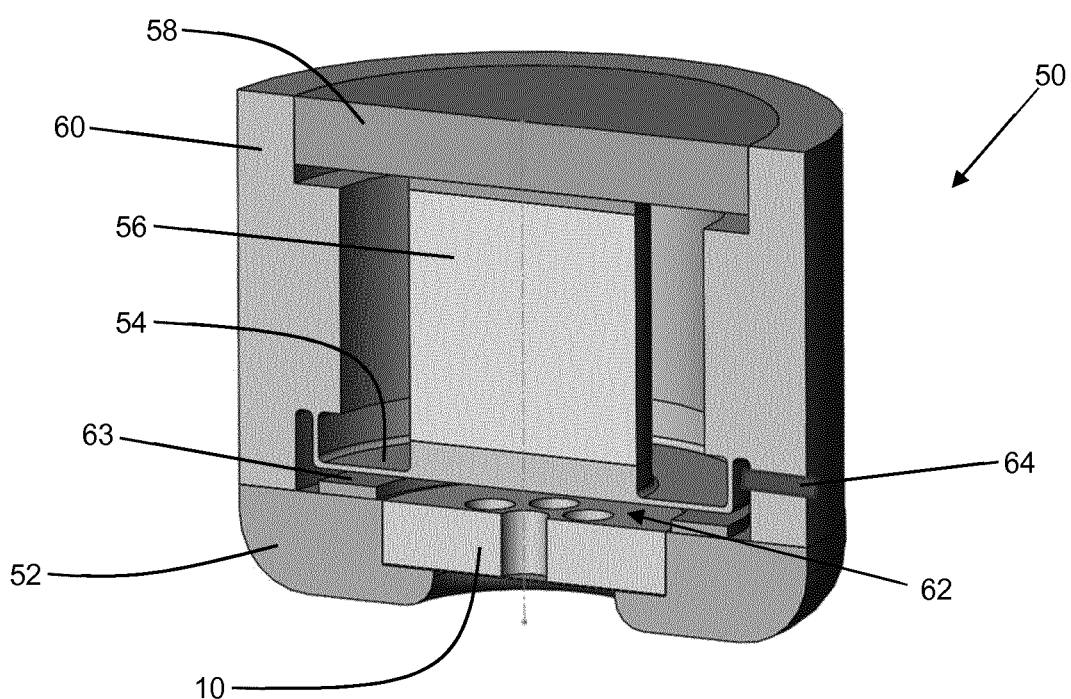
FIG. 6 shows a perspective cross-sectional view of an atomiser assembly according to an embodiment of the present invention having the mesh element of FIG. 1.

FIG. 6 shows a perspective cross-sectional view of an atomiser assembly 50 comprising the mesh element 10 of FIG. 1. The mesh element 10 is received within a mesh element housing 52. The atomiser assembly 50 also comprises an elastically deformable element 54 and an actuator 56 arranged to oscillate the elastically deformable element 54. The actuator 56 is a piezoelectric actuator.

The atomiser assembly 50 also comprises a pre-loading element 58 arranged to compress the actuator 56 between the pre-loading element 58 and the elastically deformable element 54. The pre-loading element 58, the actuator 56 and the elastically deformable element 54 are arranged within an actuator housing 60. The actuator housing 60 is attached to the mesh element housing 52 to define a cavity 62 between the mesh element 10 and the elastically deformable element 54. The actuator housing 60 defines a liquid inlet 64 for providing a supply of liquid to be atomised to the cavity 62.

The elastically deformable element 54 extends radially outward of the mesh element 10, over the mesh element housing 52 to the actuator housing 60. The region of the cavity 62 between the mesh element 10 and the elastically deformable element 54 is substantially circularly cylindrical. The mesh element housing 52 comprises a raised region 63 about the circumference of the mesh element 10, such that the gap between the mesh element housing 52 and the elastically deformable element 54 is narrowed around the circumference of the mesh element 10. The narrow gap between the raised region 63 of the mesh element housing 52 and the elastically deformable element 54 restricts the flow of liquid into and out of the region of the cavity 62 directly between the mesh element 10 and the elastically deformable element 54, which facilitates the generation of a high pressure of the liquid in this region. The outer region of the cavity 62, radially outward from the raised region 63 of the mesh element housing 52, extends partially into the actuator housing 60, to provide a region of the cavity 62 that is able to hold a small volume of liquid outside of the region directly between the mesh element 10 and the elastically deformable element 54. This outer region of the cavity 62 provides a reserve supply of liquid to the region between the mesh element 10 and the elastically deformable element 54 as liquid is depleted from that region during operation. The liquid inlet 64 is provided in the actuator housing 60 to supply liquid to the outer region of the cavity 62. The liquid inlet 64 is arranged offset from the region of the cavity 62 between the mesh element 10 and the elastically deformable element 54. This arrangement of the liquid inlet may reduce the possibility of liquid being pushed out of the cavity through the liquid inlet when subjected to oscillations from the elastically deformable element. This may also reduce the likelihood of air being drawn directly into that region from the liquid inlet 64.

During use, liquid to be atomised is supplied to the cavity 62 through the liquid inlet 64. The actuator 56 oscillates the elastically deformable element 54 to force at least some of the liquid within the cavity 62 through the channels 14 and the nozzles 18 of the mesh element 10. The liquid forced through the nozzles 18 of the mesh element 10 form droplets. The momentum of the liquid forced through the nozzles 18 to form the droplets carries the droplets away from the mesh element 10. Therefore, during use, the atomiser assembly 50 generates an aerosol comprising liquid droplets ejected through the mesh element 10.

Figure 7:
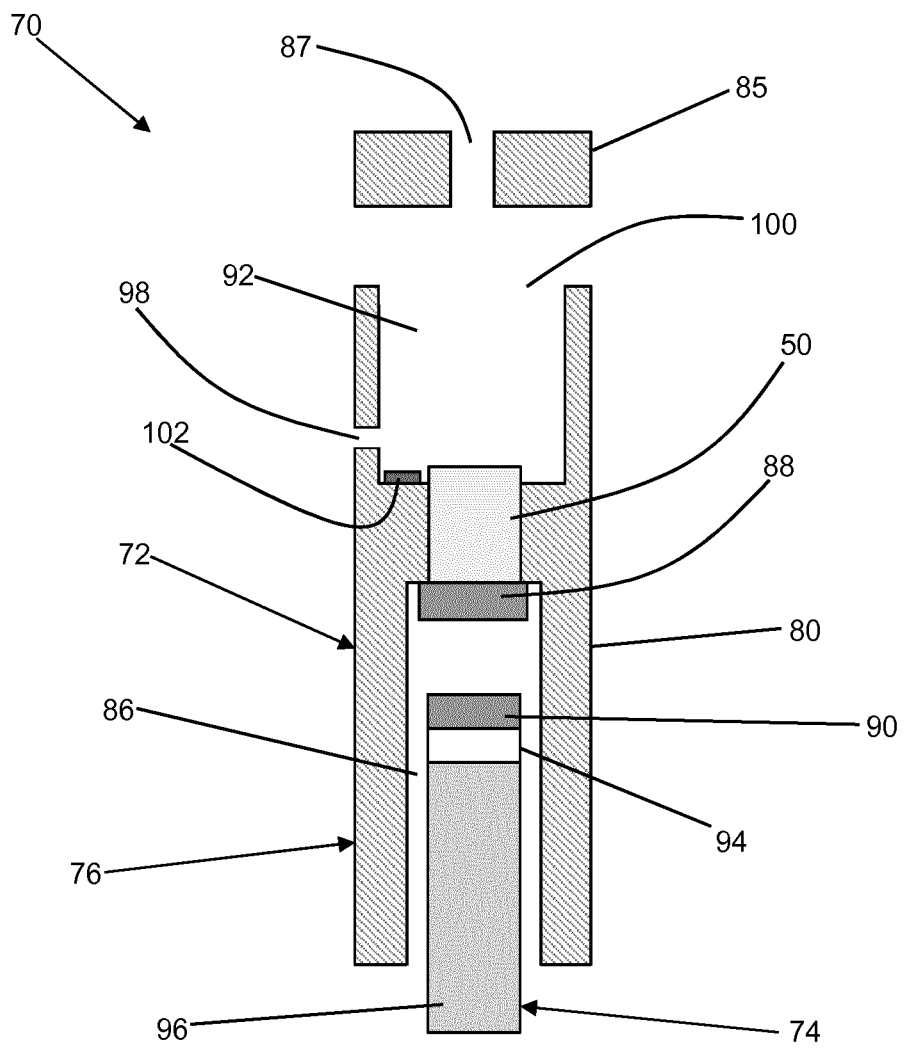
FIG. 7 shows a partially exploded cross-sectional view of an aerosol-generating system according to an embodiment of the present invention.
Figure 7:
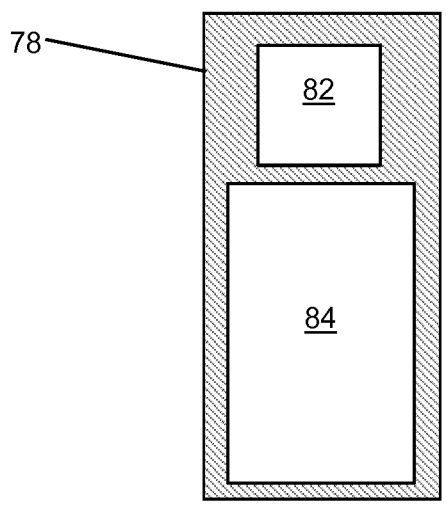

FIG. 7 shows a cross-sectional view of an aerosol-generating system 70 according to an embodiment of the present invention. The aerosol-generating system 70 comprises an aerosol-generating device 72 and a liquid reservoir 74.

The aerosol-generating device 72 comprises a housing 76 comprising a first housing portion 78 and a second housing portion 80. A controller 82 and a power supply 84 comprising a battery are positioned within the first housing portion 78. A mouthpiece 85 defining a mouthpiece channel 87 is connectable to the second housing portion 80.

The second housing portion 80 defines a liquid reservoir chamber 86 for receiving the liquid reservoir 74. The first housing portion 78 is detachable from the second housing portion 80 to allow replacement of the liquid reservoir 74.

The aerosol-generating device 72 also comprises a device connector 88 positioned within the liquid reservoir chamber 86 for engagement with a reservoir connector 90 that forms part of the liquid reservoir 74.

The aerosol-generating device 72 comprises the atomiser assembly 50 of FIG. 6 positioned within the second housing portion 80. The liquid inlet 64 of the atomiser assembly 50 is in fluid communication with the device connector 88. The mesh element 10 of the atomiser assembly 50 is positioned within an aerosol chamber 92 defined by the second housing portion 80.

The liquid reservoir 74 comprises a container 94 and a liquid aerosol-forming substrate 96 positioned within the container 94. When the reservoir connector 90 is engaged with the device connector 88, liquid aerosol-forming substrate 96 from the liquid reservoir 74 is supplied to the cavity 62 of the atomiser assembly 50 through the reservoir connector 90, the device connector 88, and the liquid inlet 64 of the atomiser assembly 50.

When the first housing portion 78 is connected to the second housing portion 80, the controller 82 controls a supply of power from the power supply 84 to the actuator 56 to eject droplets of the liquid aerosol-forming substrate 96 into the aerosol chamber 92 from the mesh element 10. The controller 82 comprises a memory storing frequency calibration data. The frequency calibration data comprises information corresponding to the power required to be supplied to the actuator 56 to oscillate the elastically deformable element 54 at a resonant frequency of the oscillation system. During operation, the controller 82 accesses the frequency calibration data stored on the memory and controls the power supplied to the actuator 56 based on the frequency calibration data such that the elastically deformable element 54 is oscillated at a resonant frequency of the oscillation system.

The second housing portion 80 defines an air inlet 98 and an air outlet 100 each in fluid communication with the aerosol chamber 92. During use, a user draws on the mouthpiece 85 to draw air into the aerosol chamber 92 through the air inlet 98. The air flows through the aerosol chamber 92 where droplets of liquid aerosol-forming substrate 96 ejected from the mesh element 10 are entrained within the airflow to form an aerosol. The aerosol flows out of the aerosol chamber 92 through the air outlet 100 and is delivered to the user through the mouthpiece channel 87.

The aerosol-generating device 72 also comprises an airflow sensor 102 positioned within the aerosol chamber 92. The airflow sensor 102 is arranged to provide a signal to the controller 82 indicative of a user drawing on the mouthpiece 85. The controller 82 is arranged to supply power from the power supply 84 to the actuator 56 of the atomiser assembly 50 only when the controller receives a signal from the airflow sensor 102 indicative of a user drawing on the mouthpiece 85.

The invention claimed is:

1. An atomiser assembly, comprising:
   an oscillation chamber having:
   a cavity containing a liquid to be atomized,
   a liquid inlet configured to provide a supply of the liquid to be atomized to the cavity,
   an elastically deformable element, and
   a mesh element comprising a plurality of nozzles; and
   an actuator configured to oscillate the elastically deformable element,
   wherein the oscillation chamber and the liquid contained in the cavity of the oscillation chamber form an oscillation system,
   wherein oscillation of the elastically deformable element by the actuator varies pressure inside the cavity, and
   wherein the actuator is further configured to oscillate the elastically deformable element at a resonant frequency of the oscillation system to eject liquid contained in the cavity from the cavity through the plurality of nozzles of the mesh element.

2. The atomiser assembly according to claim 1, wherein the actuator is further configured to oscillate the elastically deformable element at a resonant frequency of the oscillation system that is equal to or greater than a second harmonic of the oscillation system.

3. The atomiser assembly according to claim 1,
   wherein the oscillation chamber comprises walls defining the cavity configured to receive the liquid to be atomised,
   wherein a first one of the walls comprises the elastically deformable element,
   wherein a second one of the walls opposite the first wall comprises the mesh element, and
   wherein one of the walls comprises the liquid inlet.

4. The atomiser assembly according to claim 3, wherein the actuator is further configured to oscillate the elastically deformable element towards and away from the mesh element.

5. The atomiser assembly according to claim 1, wherein the actuator comprises a piezoelectric element.

6. The atomiser assembly according to claim 5,
   further comprising a pre-loading element,
   wherein the piezoelectric element is disposed between the pre-loading element and the elastically deformable element.

7. The atomiser assembly according to claim 6,
   wherein the piezoelectric element is compressed between the pre-loading element and the elastically deformable element, and
   wherein the pre-loading element is adjustable to vary compression of the piezoelectric element between the pre-loading element and the elastically deformable element.

8. The atomiser assembly according to claim 1, further comprising a heater configured to heat the liquid to be atomised contained in the cavity of the oscillation chamber.

9. The atomiser assembly according to claim 8, wherein the heater is disposed at or on the mesh element.

10. An aerosol-generating system, comprising:
    the atomiser assembly according to claim 1; and
    a liquid reservoir containing a supply of the liquid to be atomised, the liquid reservoir being in fluid communication with the fluid inlet of the oscillation chamber to supply liquid from the liquid reservoir to the cavity of the oscillation chamber.

11. The aerosol-generating system according to claim 10, wherein the system further comprises a cartridge comprising the liquid reservoir and an aerosol-generating device configured to removably receive the cartridge.

12. The aerosol-generating system according to claim 11, wherein the cartridge further comprises the atomiser assembly.

13. The aerosol-generating system according to claim 11, wherein the aerosol-generating device comprises the atomiser assembly.

14. The aerosol-generating system according to claim 13, wherein the aerosol-generating device further comprises a liquid identification system configured to identify the liquid to be atomised contained in the liquid reservoir of the cartridge.

15. The aerosol-generating system according to claim 14,
wherein the cartridge further comprises an identifier configured to identify the liquid contained in the liquid reservoir, and
wherein the liquid identification system of the aerosol-generating device comprises a detector configured to detect the identifier of the cartridge when the cartridge is received on the aerosol-generating device.

16. An aerosol-generating device, comprising:
the atomiser assembly according to claim 1;
a power supply;
a controller configured to control a supply of power from the power supply to the actuator; and
a connector configured to receive a liquid reservoir and to supply liquid from a liquid reservoir to the liquid inlet.

17. A method of operating an atomiser assembly,
the atomiser assembly comprising:
an oscillation chamber having:
a cavity containing a liquid to be atomised,
a liquid inlet configured to provide a supply of the liquid to be atomized to the cavity,
an elastically deformable element, and
a mesh element comprising a plurality of nozzles, and
an actuator configured to oscillate the elastically deformable element,
wherein the oscillation chamber and the liquid contained in the cavity of the oscillation chamber form an oscillation system, and
the method comprising driving the actuator to oscillate the elastically deformable element at a resonant frequency of the oscillation system to eject liquid contained in the cavity from the cavity through the nozzles of the mesh element.

* * * * *